United States Patent [19]

Hartung

[11] 3,717,538
[45] Feb. 20, 1973

[54] APPARATUS FOR FORMING ARTICLES OF THERMOPLASTIC FILM MATERIAL

[75] Inventor: Gerhard Hartung, Biesfeld, Germany

[73] Assignee: Joisten & Kettenbaum Elektro-Maschinenfabrik

[22] Filed: Dec. 31, 1970

[21] Appl. No.: 103,206

[52] U.S. Cl. .................. 156/497, 83/23, 83/29, 83/86, 83/152, 156/251, 156/285, 156/498, 156/515, 156/523, 156/581
[51] Int. Cl. ................................. B32b 31/08
[58] Field of Search......156/515, 589, 251, 581, 523, 156/497, 498, 285; 83/23, 29, 94, 97, 99, 86, 100, 152, 177

[56] References Cited

UNITED STATES PATENTS

| | | | |
|---|---|---|---|
| 3,420,727 | 1/1969 | Beck | 156/515 X |
| 3,486,955 | 12/1969 | Pääbo | 156/497 X |
| 3,028,576 | 4/1962 | Gerard | 156/251 |
| 3,101,021 | 8/1963 | Johnson | 83/99 |
| 3,399,587 | 9/1968 | Lee et al. | 83/100 X |

Primary Examiner—Edward G. Whitby
Attorney—McGlynn, Reising, Milton & Ethington

[57] ABSTRACT

There is disclosed an apparatus for forming articles of a thermoplastic film material, in particular of tubular film material, including an endless circulating conveying belt carrying and conveying said film material drawn from a storage roll, a welding die vertically movable above the belt and including an electrically heated welding band having a projecting edge producing a severed and welded seam upon being moved upon the film material, and a counter engaging platen arranged in the vicinity of said die below the conveying belt for supporting same. The apparatus is characterized by a depressor arranged within the projecting edge of the welding die, the depressor having an engaging plate provided with bores and a cavity disposed thereover and selectively capable of being connected to a vacuum or compressed air line.

10 Claims, 3 Drawing Figures

PATENTED FEB 20 1973

Inventor:
Gerhard Hartung

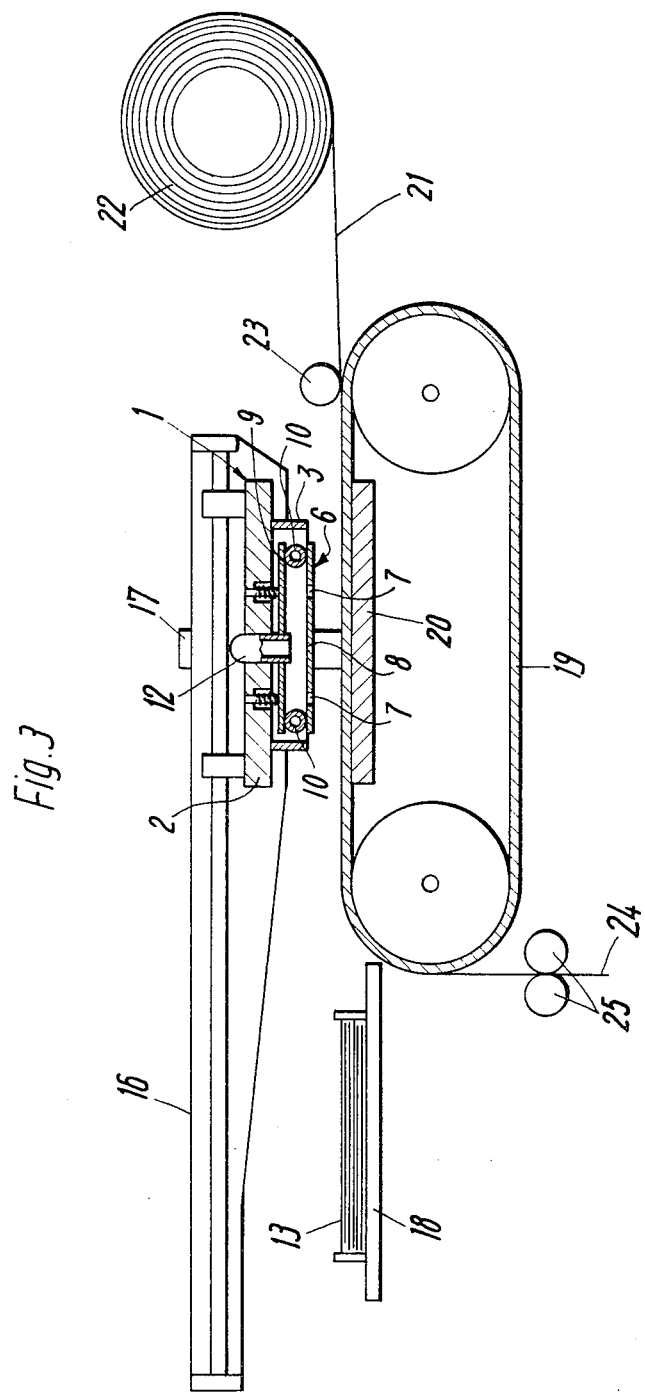

APPARATUS FOR FORMING ARTICLES OF THERMOPLASTIC FILM MATERIAL

This invention relates to an apparatus for forming articles of a thermoplastic film material, in particular of tubular film material, including an endless circulating conveying belt carrying and conveying said film material drawn from a storage roll, a welding die arranged vertically movable above the belt and including an electrically heated welding band, a projecting edge of said welding die producing a severing welding seam upon being moved upon said film material, and a counter engaging platen arranged in the vicinity of said die below said conveying belt and supporting same.

Conventional automatic welding machines of the cited type do not work fully automatic, but the only thing which is performed automatic is the conveying of the film material and the welding operation. The welded articles severed out of the film material must be taken from the conveying belt manually and must be placed on a support. The capacity of such an automatic welding machine therefore depends on the working speed of the operator stacking the articles, and it cannot be increased to any desired rate.

An object of the invention is to provide an apparatus for forming articles of a thermoplastic film material the working speed of which and the capacity of which are substantially greater than those of the conventional apparatus, wherein no manual operations are necessary anymore. In particular an object of the invention therefore is to provide a welding die by means of which the article can be lifted from the endless circulating conveying belt and can then be released again over a support platen.

A feature of this invention therefore is to provide a depressor arranged within a projecting edge of the welding die, said depressor having an engaging plate provided with bores and a cavity disposed thereover and selectively capable of being connected to a vacuum or to a compressed air line. After the welding of an article a vacuum is generated in the cavity provided in the depressor so that the article is pulled against the engaging plate and is retained thereat by vacuum applied through the bores disposed in the engaging plate of the depressor. The welding die is then moved over the support platen, and the cavity provided in the depressor is connected to a compressed air line, so that the pressure in the cavity rises and air flows out through the bores in the engaging plate and thereby releases the article again.

According to a further feature of the invention it is in particular contemplated that the engaging plate of the depressor has the form of the article to be formed and that the edge of the engaging plate is disposed slightly within the welding band. Should the article for instance have the form of a glove, the form of a glove is likewise chosen for the depressor which is merely basically slightly reduced in scale.

According to a further feature of this invention it is contemplated that the depressor is arranged resilient at the base plate of the welding die. Thereby it is accomplished that the engaging plate always completely engages the article and no outside or ambient air can get between the article and the engaging plate through the bores of the engaging plate into the cavity when generating the vacuum.

Furthermore the invention contemplates tubes disposed in the depressor for receiving a coolant, the tubes being in a heat conductive connection to the engaging plate. Because of the cooling tubes the temperature of the portions of the engaging plate disposed in the vicinity of the welding band does not rise to such an extent that the film material or the articles are heated in an impermissible manner by the engaging plate. Preferably the cooling tubes are arranged at the margin of the depressor or the engaging plate, since these portions are in the vicinity of the electrically heated welding band.

Finally the invention contemplates a guide carrying the vertically upwardly and downwardly movable welding die for moving it vertically from the counter engaging plate and then horizontally to a position over the support platen, and vice versa.

With the foregoing objects in view, together with such additional objects and advantages as may subsequently appear, the invention resides in the parts, and in the construction, combination and arrangements of parts disclosed, by way of example, in the following specification of certain modes of execution of the invention; reference being had to the accompanying drawings which form a part of the specification and wherein the drawings:

FIG. 3 is a diagrammatic illustration of a guide moving the welding die in the lifted position over the support platen and back therefrom again.

Figure 1:
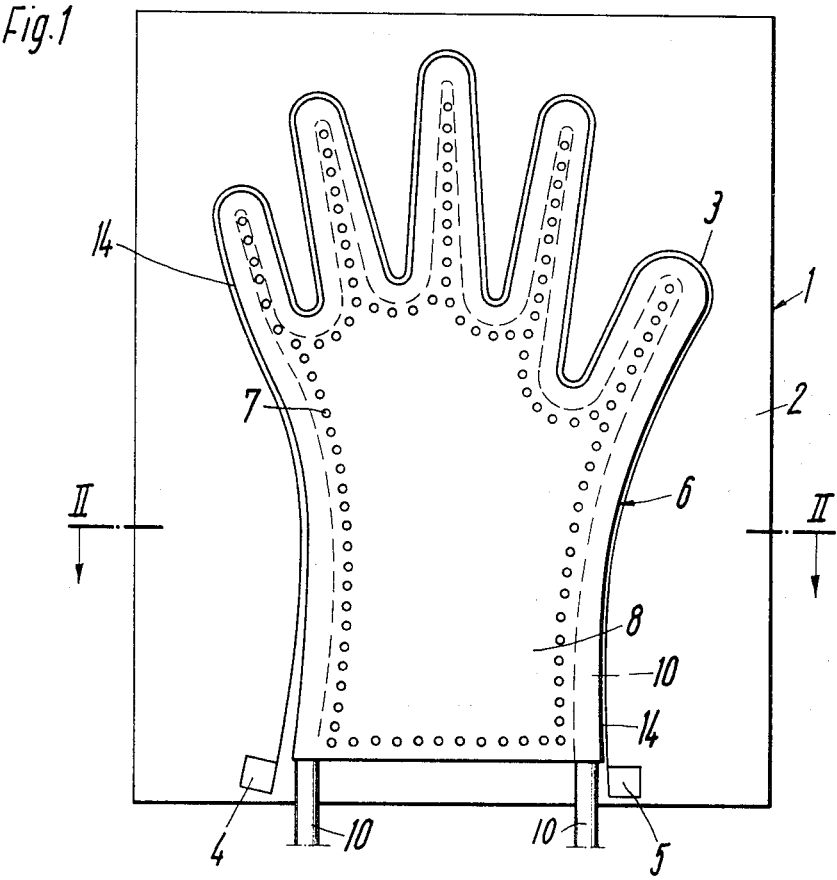
FIG. 1 is a plane view of a depressor according to this invention.

The welding die of this invention is generally indicated at 1 and includes a base plate 2 which supports an electrically heatable welding band 3 having terminals 4 and 5 also supported from the base plate 2 is a depressor generally indicated at 6. This depressor 6 comprises an engaging plate 8 provided with a large number of bores 7, a plate 9 disposed parallel thereto, and a cooling tube 10 arranged between the two plates 8 and 9. Thus a cavity 11 is provided between the plates 8 and 9 and is in communication with a vacuum or compressed air line 12 through a further tube.

Figure 2:
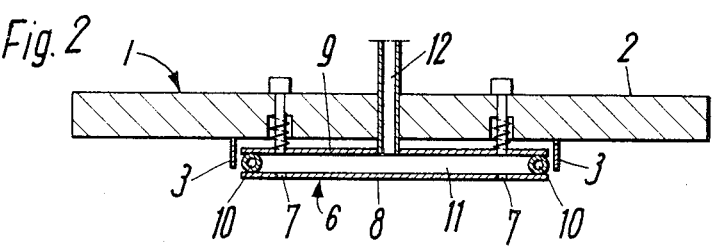
FIG. 2 is a cross sectional view of the depressor and the base plate of the welding die along line II—II of FIG. 1.

The depressor 6 is resiliently attached to the base plate 2 of the welding die 1, as shown in FIG. 2, so that a good and reliable engagement of the engaging plate 8 with the article or the film material 21 is accomplished during the welding operation. Above all things the engaging plate 8 must firmly abut the article 13 when generating the vacuum in the cavity 11 so that the article 13 urged against the engaging plate 8 by the pressure differential between the atmosphere and the pressure existing in the depressor.

The depressor 6 has the same form as the article 13 to be produced in order to secure a uniform lifting of the entire article. For this purpose the bores 7 are only slightly spaced from the edge of the depressor or the engaging plate 8, and in the embodiment illustrated in the drawings, a central line of bores 7 are provided up into the narror finger tips. Likewise directly at the edge 14 of the depressor 6, the cooling tube 10 is provided so that the engaging plate 8 is not heated in an impermissible manner by the welding band 3. The cooling tube 10 extends along the entire periphery 14 of the depressor 6 including the peripheral portions of the fingers. The connection for the cooling tube 10 has not been illustrated in the drawings.

In FIG. 3 the welding die 1 of this invention together with the depressor 6 is shown in an apparatus for forming the articles. The welding die 1 is shiftable on a horizontal guide 16 to a position over a support platen 18 and is vertically movable together with the horizontal guide 16 by a lifting device 17. A counter engaging plate 20 is disposed in the working region of the welding die 1 and is disposed underneath an endless circulating conveying belt 19 which conveys the plastic film material 21 from a roll 22, by means of a counter engaging roll 23, to the welding die 1. The scrap 24 remaining after severing the articles 13 out of the film material 21 is conveyed away by rolls 25.

The apparatus illustrated in FIG. 3 operates intermittently since the welding die 1 must move to the support platen 18 to deposit the newly made article 13 and then return back to the position over the counter engaging plate 20. Here the welding die is lowered onto the counter engaging plate or onto the film material 21 and severs and welds a new article 13 out of the film material 21. Subsequently the welding die 1 together with the article held by vacuum in the depressor 6 in engagement with the engaging plate 8 is moved upwardly and then shifts over to the support platen 18, where a positive pressure is generated in the depressor 6 that is, in the cavity 11 of the depressor 6, so that air flows out through the bores 7. The article 13 is thereby released by the engaging plate 8 and drops onto the support platen 18. The described cycle is then repeated.

The use of the welding die 1 of this invention is not limited to the apparatus illustrated in FIG. 3, rather the horizontal movement of the welding die 1 can also be effected transverse of the conveying direction of the endless circulating belt 19, that is, the feeding direction of the film material 21. It is also possible to attach the welding die 1 to an apparatus which performs a vertical as well as a rotary movement so that the welding die is positioned over the support platen 18 together with the welded out article after a rotation by 180°.

Not withstanding the illustrated uses of the invention and the manners by which such uses may be achieved, it is appreciated that changes and modifications will suggest themselves to others skilled in the art both for uses similar to those illustrated as well as for other uses. The invention, therefore, is not to be deemed to be limited to the exact modes of execution above disclosed by way of example, and it will be understood that the invention embraces all such changes and modifications in the parts, and in the construction, combination and arrangement of parts as shall come within the purview of the appended claims.

What is claimed is:

1. An apparatus for forming articles from multiple layers of thermoplastic material comprising: platen means for supporting layers of thermoplastic material, conveying means for conveying multiple layers of thermoplastic material over said platen means, welding means selectively movable into engagement with the thermoplastic material for pressing the material against said platen means and including heated edge means for producing a severed and welded seam in the multiple layers of the thermoplastic material, and depressor means adjacent to said edge means and connected to said welding means for applying a vacuum to the material being severed and welded to remove same from said platen means as said welding means moves therefrom and for subsequently applying air pressure to the severed and welded material to remove same therefrom.

2. An apparatus as set forth in claim 1 wherein said depressor means includes a plate defining the bottom of a cavity in said depressor means and said plate has bores extending therethrough to establish fluid communication with said cavity, and means for selectively supplying said vacuum and said air pressure to said cavity.

3. An apparatus as set forth in claim 1 wherein said edge means defines the periphery of an article to be formed by severing and welding the layers of the thermoplastic material together, said plate of said depressor means having an edge which is closely spaced to and within said edge means.

4. An apparatus as set forth in claim 3 wherein said welding means includes a base and said edge means depends from said base, and means for resiliently attaching said depressor means to said base.

5. An apparatus as set forth in claim 4 wherein said depressor means includes cooling means for cooling said plate thereof.

6. An apparatus as set forth in claim 5 wherein said cooling means includes a cooling tube disposed about the edge of said plate.

7. An apparatus as set forth in claim 6 including an article supporting platen spaced horizontally from said platen means, guide means for moving said welding means vertically upwardly from said platen means and horizontally to a position over said article supporting platen and vice versa whereby an article defined by the severed and welded layers of thermoplastic material may be removed from said platen means as a vacuum is applied thereto by said depressor means and deposited upon said article supporting platen as air pressure is applied to the article by said depressor means.

8. An apparatus as set forth in claim 1 including means for resiliently attaching said depressor means to said welding means.

9. An apparatus as set forth in claim 1 wherein said depressor means includes cooling means.

10. An apparatus as set forth in claim 1 including an article supporting platen spaced horizontally from said platen means, guide means for moving said welding means vertically upwardly from said platen means and horizontally to a position over said article supporting platen and vice versa whereby an article defined by the severed and welded layers of thermoplastic material may be removed from said platen means as a vacuum is applied thereto by said depressor means and deposited upon said article supporting platen as air pressure is applied to the article by said depressor means.

* * * * *

UNITED STATES PATENT OFFICE
CERTIFICATE OF CORRECTION

Patent No. 3,717,538              Dated February 20, 1973

Inventor(s) Gerhard Hartung

It is certified that error appears in the above-identified patent and that said Letters Patent are hereby corrected as shown below:

Column 4, line 19 "1" should be -- 2 --.

Signed and sealed this 26th day of February 1974.

(SEAL)
Attest:

EDWARD M. FLETCHER, JR.    C. MARSHALL DANN
Attesting Officer          Commissioner of Patents